United States Patent
Schmid

(10) Patent No.: US 8,333,156 B2
(45) Date of Patent: Dec. 18, 2012

(54) METHOD AND DEVICE FOR CONTROLLING THE DRIVE OF A MAGNETIC LEVITATION VEHICLE ON A MAGNETIC LEVITATION TRACK

(75) Inventor: Robert Schmid, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 544 days.

(21) Appl. No.: 12/524,653

(22) PCT Filed: Jan. 21, 2008

(86) PCT No.: PCT/EP2008/050654
§ 371 (c)(1),
(2), (4) Date: Sep. 21, 2009

(87) PCT Pub. No.: WO2008/090129
PCT Pub. Date: Jul. 31, 2008

(65) Prior Publication Data
US 2010/0126373 A1 May 27, 2010

(30) Foreign Application Priority Data
Jan. 26, 2007 (DE) .......................... 10 2007 004 919

(51) Int. Cl.
*B60L 13/06* (2006.01)

(52) U.S. Cl. .......................... 104/284; 104/282; 104/281

(58) Field of Classification Search .................. 104/281, 104/282, 283, 284
See application file for complete search history.

(56) References Cited

U.S. PATENT DOCUMENTS 3,865,043 A * 2/1975 Schwarzler ................... 104/284
4,140,063 A * 2/1979 Nakamura ..................... 104/284
(Continued)

FOREIGN PATENT DOCUMENTS
DE 2813253 C2 12/1982
(Continued)

OTHER PUBLICATIONS

Ohashi S: "Effect of the damper coils on the rotational motion of the superconducting magnetically levitated bogie", Magnetics Conference, 2000, INTERMAG 2000, Digest of Technical Papers, 2000 IEEE International Apr. 9-13, 2000 Piscataway, NJ, USA, IEEE Apr. 9, 2000, p. 666, XP010539740.
(Continued)

Primary Examiner — Jason C Smith
(74) Attorney, Agent, or Firm — Laurence A. Greenberg; Werner H. Stemer; Ralph E. Locher

(57) ABSTRACT

A method provides for the traction control of a maglev car on a maglev track. A levitation magnetic field is produced by supplying a levitation magnetic flux on the car side to at least two levitation magnets to produce a defined air gap between the maglev car and a reaction rail on the track side. A stator current is supplied to the stator to produce a propulsion force on the maglev track, the propulsion force acts upon the maglev car being determined by the magnetic coupling between the magnetic stator field and the magnetic levitation field. An oscillating movement of the maglev car in relation to the magnetic stator field is dampened by changing the magnetic coupling between the magnetic stator field and the magnetic levitation field on the car side. The levitation magnets are operated on the car side with at least two different individual levitation magnetic fluxes.

20 Claims, 4 Drawing Sheets

U.S. PATENT DOCUMENTS

Figure 1:
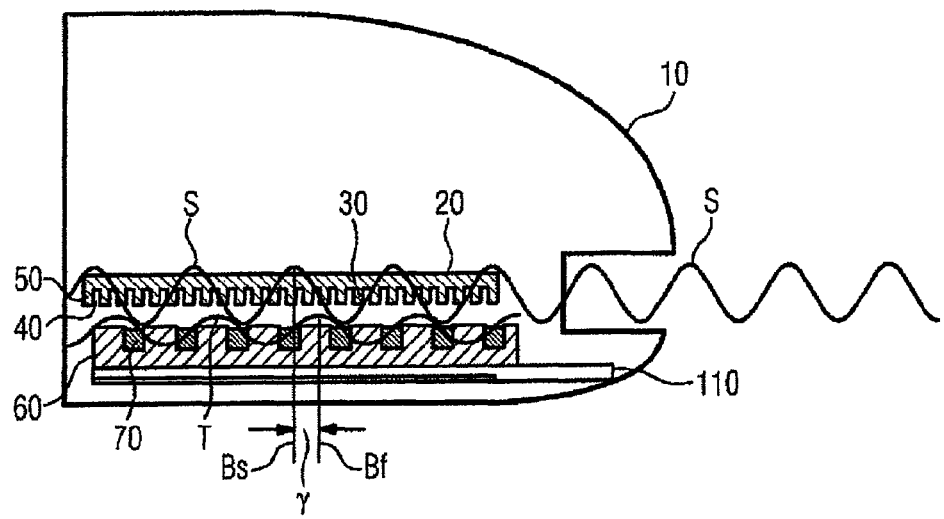

| | | | | | |
|---|---|---|---|---|---|
| 4,238,715 | A | * | 12/1980 | Parsch et al. | 318/135 |
| 4,607,203 | A | * | 8/1986 | Bohm et al. | 318/687 |
| 4,698,895 | A | * | 10/1987 | Miller et al. | 29/464 |
| 4,731,569 | A | * | 3/1988 | Bohn | 318/687 |
| 5,053,654 | A | * | 10/1991 | Augsburger et al. | 310/12.09 |
| 5,628,252 | A | * | 5/1997 | Kuznetsov | 104/284 |
| 5,666,883 | A | * | 9/1997 | Kuznetsov | 104/281 |
| 5,868,077 | A | * | 2/1999 | Kuznetsov | 104/281 |
| 5,904,101 | A | * | 5/1999 | Kuznetsov | 104/281 |
| 6,827,022 | B2 | * | 12/2004 | van den Bergh et al. | 104/284 |
| 6,983,701 | B2 | * | 1/2006 | Thornton et al. | 104/282 |
| 7,380,508 | B2 | * | 6/2008 | Li | 104/284 |
| 7,637,214 | B2 | * | 12/2009 | Beck et al. | 104/284 |
| 2005/0252407 | A1 | * | 11/2005 | Li | 104/139 |
| 2006/0096495 | A1 | * | 5/2006 | Fischperer | 104/281 |
| 2006/0097116 | A1 | * | 5/2006 | Fischperer | 246/468 |
| 2006/0130699 | A1 | * | 6/2006 | Thornton et al. | 104/284 |
| 2006/0219128 | A1 | * | 10/2006 | Li | 104/284 |
| 2006/0243157 | A1 | * | 11/2006 | Li | 104/281 |
| 2006/0243158 | A1 | * | 11/2006 | Li | 104/281 |
| 2007/0095245 | A1 | * | 5/2007 | Li | 104/284 |
| 2007/0131134 | A1 | * | 6/2007 | Post | 104/284 |
| 2008/0257198 | A1 | * | 10/2008 | Beck et al. | 104/284 |
| 2010/0126373 | A1 | * | 5/2010 | Schmid | 104/282 |

FOREIGN PATENT DOCUMENTS

| | | |
|---|---|---|
| DE | 3433149 A1 | 3/1986 |
| DE | 102004013692 A1 | 10/2005 |

OTHER PUBLICATIONS

Yoshida et al.: "Pitching Stability Analysis and Control for Underwater Maglev Linear Vehicle ME02" 12th International Power Electronics and Motion Control Conference, IEEE, PI, Aug. 1, 2006, pp. 1814-1819, XP031009184.

German Office Action dated Sep. 26, 2007.

International Search Report dated Sep. 1, 2008.

* cited by examiner

METHOD AND DEVICE FOR CONTROLLING THE DRIVE OF A MAGNETIC LEVITATION VEHICLE ON A MAGNETIC LEVITATION TRACK

BACKGROUND OF THE INVENTION

Field of the Invention

The invention relates to a method for controlling the drive of a magnetic levitation vehicle on a magnetic levitation track having the features according to the preamble of claim 1.

Such a method is used, for example, in the Transrapid system.

In the Transrapid system, the rotor voltage which is induced in the track-side stator by the levitation magnetic field of the moving magnetic levitation vehicle is observed at relatively high speeds. For this purpose, currents and voltages are measured at the connections of the track-side stator and therefore at the output of the drive power converter and are fed to a mathematical model of the drive system. This so-called "up method" is well suited for relatively high speeds, but it requires a minimum speed of the magnetic levitation vehicle because the voltages induced in the track-side stator are otherwise too small for evaluation. The respective pole angle between the vehicle and the stator magnetic field which moves in the direction of travel is measured with the measured values of the induced rotor voltage, and in the process it is determined whether the vehicle is moving more quickly or more slowly than the stator magnetic field, and in this way the speed of the stator magnetic field is adjusted in order to avoid an oscillating movement of the vehicle relative to the stator magnetic field.

At low speeds, a mixed incremental/absolute locating system is used in the Transrapid system, which uses reference marks and the grooves of the track-side stator to determine the location of the magnetic levitation vehicle. The pole angle information is acquired as a difference between the electrical angle and the mechanical angle from knowledge of the position of the traveling wave winding relative to the route and the phase angle of the stator currents. However, this previously known method relies on a data transmission channel from the vehicle to the locationally fixed or track-side drive controller which is real-time-capable to a high degree so that damping oscillating movements of the vehicle is complicated.

BRIEF SUMMARY OF THE INVENTION

Taking this as a basis, the invention is based on the object of specifying a method for controlling the drive of a magnetic levitation vehicle with which oscillating movements of the vehicle relative to the stator magnetic field can be avoided or at least reduced even at a low vehicle speed or when the vehicle is stationary.

This object is achieved according to the invention by means of a method having the features according to claim 1. Advantageous refinements of the invention are specified in subclaims.

Accordingly, the invention provides that an oscillating movement of the magnetic levitation vehicle relative to the stator magnetic field is damped by changing the magnetic coupling between the stator magnetic field and the levitation magnetic field on the vehicle side, by operating the levitation magnets on the vehicle side with at least two individual levitation magnet currents of different sizes.

A significant advantage of the method according to the invention is that any oscillating movements, such as can occur, for example, during controlled starting up of the vehicle, can be avoided solely on the vehicle side, and there is therefore no need for any complicated transmission of data between the vehicle and the track-side drive controller. If, in fact, an oscillating movement is detected on the vehicle side, a counteracting change in the coupling between the stator magnetic field and the levitation magnetic field can be used to damp the oscillating movement without a change in the speed of the stator magnetic field being necessary: in other words, in contrast to the previously known method according to the prior art, the speed of the stator magnetic field is therefore not changed in order to reduce or to avoid an oscillating movement but rather the magnetic coupling between the stator magnetic field and the levitation magnetic field is varied in order to reduce or to avoid an oscillating movement. The invention makes use here of the realization that the motor constant, that is to say the ratio between the propulsion force which acts on the vehicle and the stator current, depends on the respective levitation magnet current—the larger the levitation magnet current the greater the degree of coupling between the levitation magnetic field and the driving stator magnetic field, and therefore the motor constant. The invention also makes use of the realization that the coupling between the levitation magnetic field and the driving stator magnetic field can be changed without the levitation effect of the levitation magnets having to be changed in their entirety—if individual levitation magnets are operated with a different levitation magnet current than other levitation magnets, it is possible, given suitable distribution of the current, nevertheless to keep the sum of the forces of all the levitation magnets constant, but the magnetic coupling between the levitation magnetic field and the driving stator magnetic field is nevertheless modified. At this point, the invention comes into effect in that the invention proposes operating the levitation magnets on the vehicle side with at least two individual levitation magnet currents which are of different sizes in order to modify the magnetic coupling between the levitation magnetic field and the driving stator magnetic field if an oscillating movement is to be damped.

A further significant advantage of the method according to the invention is that, even in the case of a total failure of the transmission of data between the vehicle and the track-side drive controller, the vehicle can be recovered from the corresponding section of the route at the responsibility of the personnel—carried out from the vehicle—by damping on the vehicle side any oscillating movement which occurs.

In order to avoid the anti-oscillation controller having a disadvantageous effect on the driving behavior of the vehicle, it is considered advantageous if the distribution of the current between the levitation magnets is set in such a way that the air gap between the magnetic levitation vehicle and the reaction rail remains constant independently of the respectively set magnetic coupling.

In order to avoid an oscillating movement, a change in the pole angle between the stator magnetic field and a magnetic reference axis of the magnetic levitation vehicle is preferably counteracted.

The change in the pole angle over time is measured to form a change variable, and the coupling between the stator magnetic field and the levitation magnetic field is changed as a function of the change variable.

In order to avoid an oscillating movement, the coupling is preferably reduced if the magnetic levitation vehicle is moving more quickly than the stator magnetic field in the direction of travel, and the coupling is increased if the magnetic levitation vehicle is moving more slowly than the stator magnetic field in the direction of travel.

According to one particularly preferred variant there is provision that, in a predefined special operating state (for example when the vehicle is starting up), at least two individual levitation magnet currents of different sizes are fed into the levitation magnets, and a special coupling, which is reduced compared to the maximum possible coupling, between the stator magnetic field and the levitation magnetic field is set, that, if the magnetic levitation vehicle is moving more quickly than the stator magnetic field in the direction of travel, the coupling is reduced by increasing the difference in current in the individual levitation magnet currents, and that, if the magnetic levitation vehicle is moving more slowly than the stator magnetic field in the direction of travel, the coupling is increased by reducing the difference in current in the individual levitation magnet currents.

The levitation magnet pairs are preferably respectively actuated in pairs in such a way that the levitation force of a levitation magnet pair respectively remains constant. For example, the levitation magnet pairs are formed in such a way that the levitation magnets of each levitation magnet pair are respectively located directly next to one another.

The levitation magnet pairs are preferably formed in such a way that in each case a force transmitting device for transmitting a force between a frame of the magnetic levitation vehicle and the respective levitation magnet pair is located between the levitation magnets of each levitation magnet pair.

In order to ensure balanced loading and uniform wear, it is considered advantageous if the current through the levitation magnets is controlled over time in such a way that averaged over time the same current flows through all the levitation magnets.

The set difference in current between the individual levitation magnet currents in the predefined special operating state can also be selected as a function of the control effect which is required at the respective time, and the difference in current is set smaller the smaller the respectively required control effect.

The invention also relates to a magnetic levitation vehicle which comprises a gap measuring device for measuring the air gap between levitation magnets of the magnetic levitation vehicle and a track-side reaction rail, and a control device which is connected to the gap measuring device and has the purpose of generating a levitation magnet current for the levitation magnets of the magnetic levitation vehicle.

According to the invention, the control device is configured in such a way that, in order to damp an oscillating movement of the magnetic levitation vehicle relative to the stator magnetic field, said control device can change the magnetic coupling between the stator magnetic field and the levitation magnetic field by feeding individual levitation magnet currents of different sizes into the levitation magnets.

With respect to the advantages of the magnetic levitation vehicle according to the invention and with respect to the advantages of advantageous refinements of the magnetic levitation vehicle, reference is made to the above statements relating to the method according to the invention since the advantages of the method according to the invention correspond substantially to those of the magnetic levitation vehicle according to the invention.

The control device is preferably suitable for dimensioning the individual levitation magnet currents in such a way that the total levitation force of all the levitation magnets of the magnetic levitation vehicle and the air gap between the magnetic levitation vehicle and the reaction rail remains constant independently of the respectively set magnetic coupling.

For example, a pole angle change measuring device, which measures the change in the pole angle over time to form a change variable, is connected to the control device. The pole angle change measuring device can comprise, for example, a pole angle measuring device and a differentiating element.

Alternatively or additionally, the pole angle change measuring device can comprise an acceleration sensor for measuring the acceleration of the magnetic levitation vehicle, a difference forming element which is arranged downstream of the acceleration sensor and forms a difference value between the respective acceleration value of the acceleration sensor and a predefined or measured acceleration value of the stator magnetic field, and an integrating element which is arranged downstream of the difference forming element.

The pole angle change measuring device can also comprise two induction coils and an evaluation device arranged downstream.

For the sake of homogeneous distribution of the levitation force, it is considered advantageous if the levitation magnets of each levitation magnet pair are respectively located directly next to one another. In each case a force transmitting device for transmitting force between a frame of the magnetic levitation vehicle and each levitation magnet pair is preferably located between the levitation magnets of the respective levitation magnet pair. For example, at least one of the force transmitting devices of the magnetic levitation vehicle is formed by a spring.

The invention will be explained in more detail below with reference to exemplary embodiments; in the drawings, illustrated in each case by way of example:

BRIEF DESCRIPTION OF THE SEVERAL
VIEWS OF THE DRAWING

Figure 2:
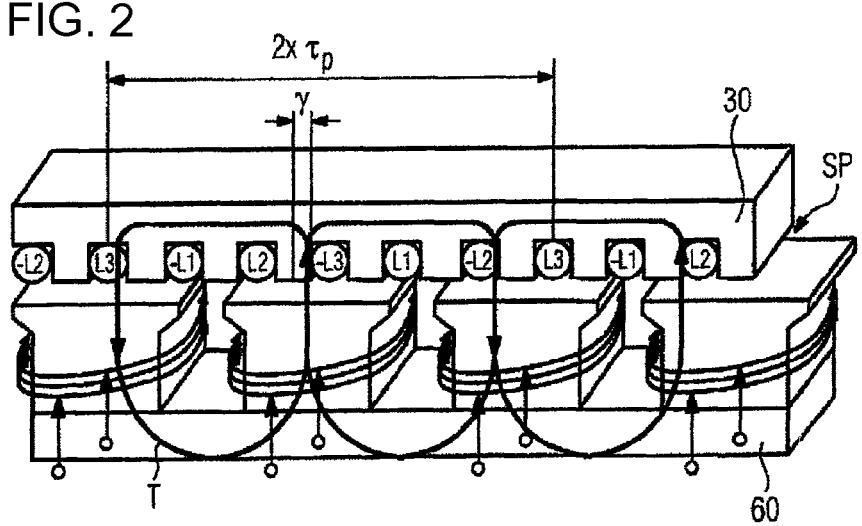
Figure 3:
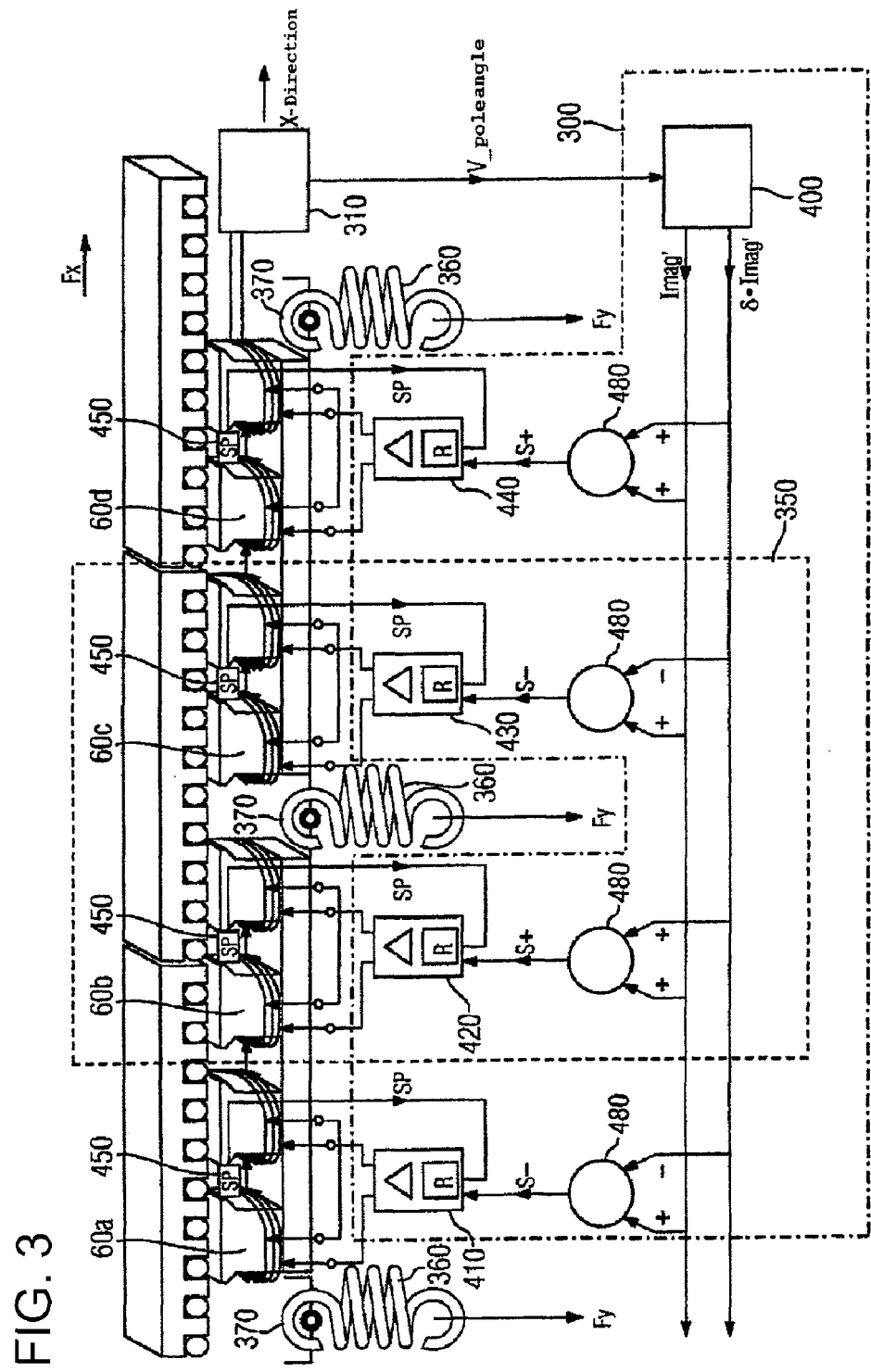
Figure 4:
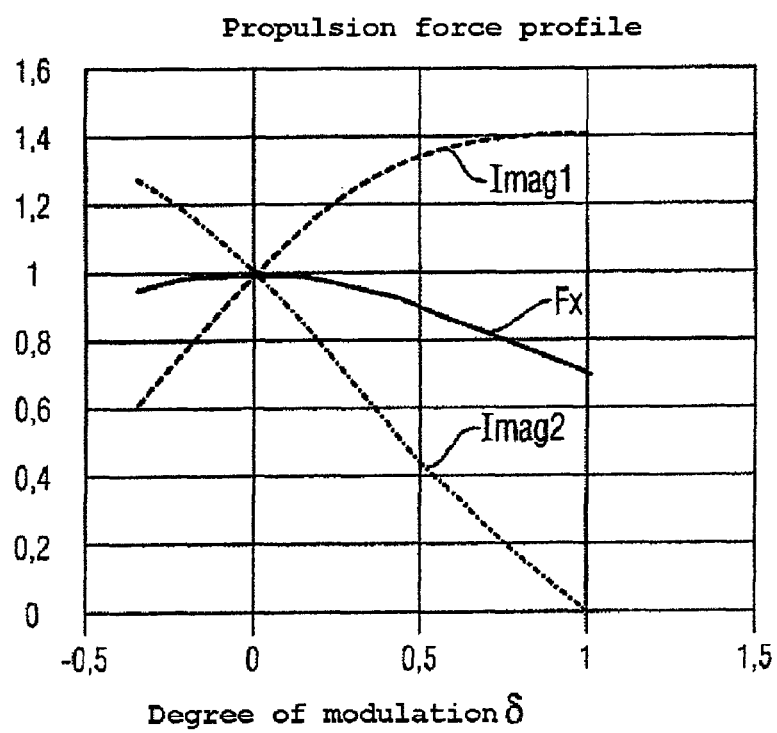
Figure 5:
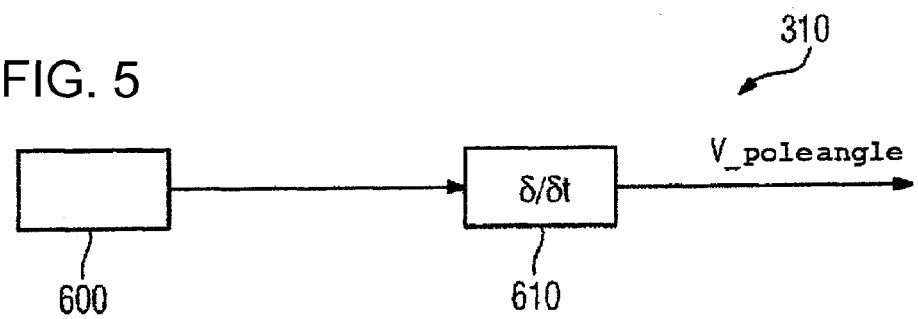
Figure 6:
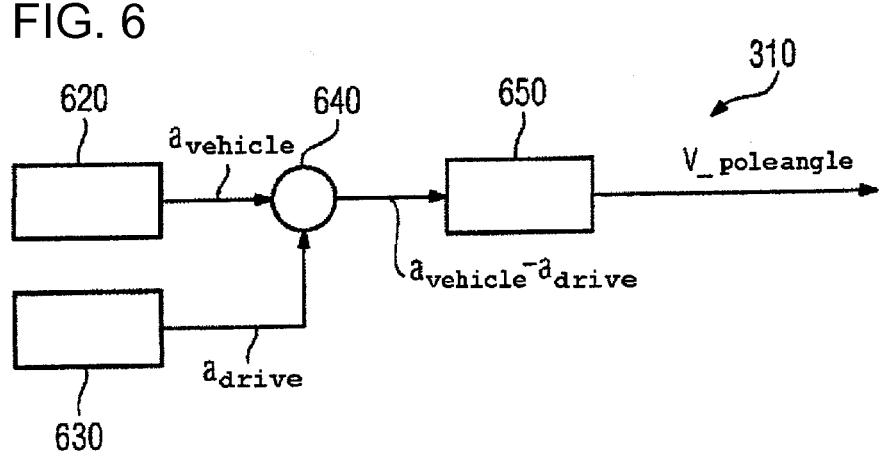
Figure 7:
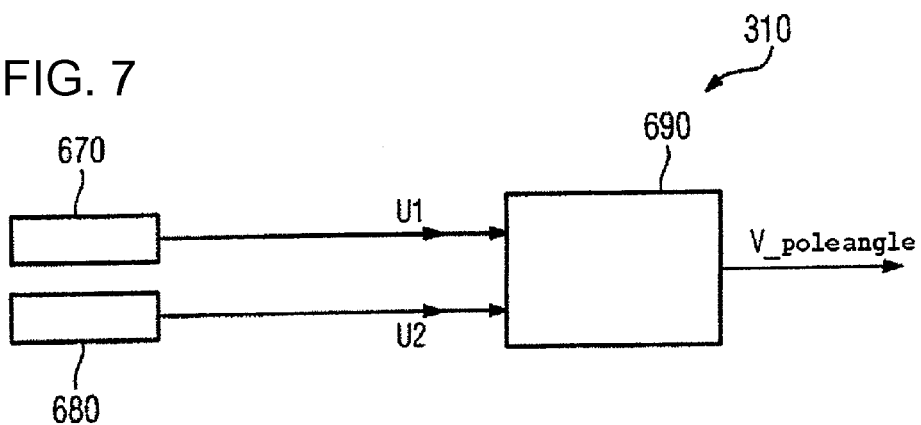

FIG. 1 shows a magnetic levitation vehicle for the purpose of general explanation, FIG. 2 shows a levitation magnet of the magnetic levitation vehicle and a stator according to FIG. 1 in detail, FIG. 3 shows an exemplary embodiment of a magnetic levitation vehicle according to the invention with a control device for damping an oscillating movement, FIG. 4 shows the dependence of the propulsion force on a modulation factor, FIG. 5 shows a first exemplary embodiment of a pole angle change measuring device with a differentiating element, FIG. 6 shows a second exemplary embodiment of a pole angle change measuring device with an integrating element, and FIG. 7 shows a third exemplary embodiment of a pole angle change measuring device with two induction coils.

In FIGS. 1 to 7, the same reference symbols are used for identical or comparable components for reasons of clarity.

DESCRIPTION OF THE INVENTION

FIG. 1 shows the front region of a magnetic levitation vehicle 10 which is located on a magnetic levitation track 20. A track-side stator 30, which is equipped with stator grooves 40 and stator teeth 50, can be seen on the magnetic levitation track in FIG. 1.

In the stator grooves 40 there are solenoids (not illustrated in more detail in FIG. 1) for generating a stator magnetic field. The fundamental wave of the stator magnetic field is denoted in FIG. 1 by the reference symbol S. The arrangement or the position of the solenoids defines a magnetic reference axis Bs of the stator 30.

Only a section of the stator 30 is illustrated in FIG. 1; the stator 30 extends over the entire track of the magnetic levitation railroad and therefore also generates the stator magnetic field S in front of the magnetic levitation vehicle 10, as can be seen in FIG. 1.

Furthermore, FIG. 1 illustrates a front levitation magnet 60 of the magnetic levitation vehicle 10; said front levitation magnet 60 is equipped with solenoids 70 which generate a levitation magnetic field for lifting up the magnetic levitation vehicle 10. The levitation magnetic field is denoted in FIG. 1 by the reference symbol T. The arrangement or the position of the levitation magnet 60 defines a magnetic reference axis Bf of the magnetic levitation vehicle 10. The levitation magnet 60 is mounted on a carrier 110.

FIG. 2 shows the track-side stator 30 and the levitation magnet 60 once more in more detail. The stator windings of the stator 30, which are denoted by the reference symbols L1, L2 and L3, can be seen; the reference symbols L1, L2 and L3 simultaneously indicate the association of the stator winding with the respective electrical phase of the three-phase current system.

The magnetic flux of the levitation magnetic field is in turn denoted by the reference symbol T. Furthermore, the air gap between the levitation magnet 60 and the stator 30 is indicated by the reference symbol SP.

By way of example, FIG. 3 shows the electrical actuation of the vehicle 10 in more detail. A control device 300 for controlling the magnetic levitation vehicle and a pole angle change measuring device 310 arranged upstream can be seen.

The levitation magnets 60 are connected to the control device 300, four of said levitation magnets 60 being shown by way of example in FIG. 3 and being denoted by the reference symbols 60*a*, 60*b*, 60*c* and 60*d*.

The levitation magnets are arranged in levitation magnet pairs, one of which is denoted by way of example by the reference symbol 350. The levitation magnets of each levitation magnet pair are respectively located directly next to one another. It can be seen that in each case a force transmitting device in the form of a pliant spring 360 for transmitting force between the frame (not shown in more detail in FIG. 3) of the magnetic levitation vehicle and each levitation magnet pair is arranged between the levitation magnets of the respective levitation magnet pair. The part 370 which connects the two levitation magnets of a levitation magnet pair permits only a common lifting movement of the levitation magnets. This means that the levitation force which is necessary on the frame to support the frame and therefore to support the car body can be divided between the two levitation magnets 60*b* and 60*c* in freely selectable portions.

For the levitation mode of the magnetic levitation vehicle 10, a levitation magnet current is respectively fed into the levitation magnets 60 using magnet control units 410, 420, 430 and 440, in such a way that the air gap SP which is measured on a levitation-magnet-specific basis with the respectively assigned gap sensor 450 always corresponds to a predefined nominal value. The magnet control units 410, 420, 430 and 440 may be, for example, components of the control device 300, as is shown by way of example in FIG. 3, or may be associated with the control device 300, or they can alternatively be connected downstream of the control device 300 as separate components.

The levitation magnet currents Imag1 and Imag2 of the levitation magnet pairs can then be set differently in order to influence the magnetic coupling to the stator magnetic field without a change in the gap SP between the levitation magnets and the reaction rail having to be accepted. This will now be briefly explained in more detail:

The following applies to the propulsion force or driving force Fx in the direction of travel x which is brought about by the magnetic coupling between the stator magnetic field and the levitation magnetic field:

$$Fx = kx \times \Phi h \times Ist \Rightarrow \text{(Propulsion force)} \qquad 1)$$

where kx is a coupling factor, $\Phi h$ denotes the magnetic flux of the levitation magnetic field and Ist denotes the stator current.

The following applies to the levitation force Fy which permits the vehicle 10 to levitate:

$$Fy = ky \times (\Phi h)^2 \Rightarrow \text{Levitation force} \qquad 2)$$

where ky denotes a coupling factor and $\Phi h$ denotes the levitation magnetic field.

The following applies to the levitation magnetic field $\Phi h$:

$$\Phi h = \frac{w_{mag}}{R_{mag}} \times I_{mag} \qquad 3)$$

where wmag and Rmag denote constants of the levitation magnet system and Imag denotes the respective levitation magnet current.

If equation 3) is inserted into equations 1) and 2), the following is obtained:

$$Fx = kx \times \frac{w_{mag}}{R_{mag}} \times I_{mag} \times Ist \text{ and} \qquad 4)$$

$$Fy = ky \times \left(\frac{w_{mag}}{R_{mag}}\right)^2 \times I_{mag}^2 \qquad 5)$$

The following is to apply to a levitation magnet pair 350 which has two levitation magnets 60*b* and 60*c*:

$$I_{mag1} = I_{mag}(\delta) * (1+\delta) \qquad 6)$$

$$I_{mag2} = I_{mag}(\delta) * (1-\delta) \qquad 7)$$

where Imag1 denotes the levitation magnet current in one of the two levitation magnets 60*b* of the levitation magnet pair 350, and Imag2 denotes the levitation magnet current in the other of the two levitation magnets 60*c* of the levitation magnet pair 350. $\delta$ denotes a modulation factor which gives half the difference between the two levitation magnet currents.

This results in the following equations for the total forces of the two levitation magnets 60*b* and 60*c* of the levitation magnet pair:

In the x direction:

$$\sum F_{x\_\delta} = \frac{1}{2}(k_x \times \frac{w_{mag}}{R_{mag}} I_{mag}(\delta) \times ((1+\delta) + (1-\delta)) \times I_{st} \qquad 9)$$

$$\sum F_{x\_\delta} = k_x \times \frac{w_{mag}}{R_{mag}} I_{mag}(\delta) \times I_{st} \qquad 10)$$

In the y direction:

$$\sum F_{y\_\delta} = \frac{1}{2}(k_y \times \left(\frac{w_{mag}}{R_{mag}}\right)^2 \times I_{mag}(\delta)^2 \times ((1+\delta)^2 + (1-\delta)^2) \qquad 11)$$

$$\sum F_{y\_\delta} = k_y \times \left(\frac{w_{mag}}{R_{mag}}\right)^2 \times I_{mag}(\delta)^2 \times (1+\delta^2) \qquad 12)$$

Because the total levitation force $F_y$ in the y direction has to remain constant in order to keep the gap SP between the levitation magnets and the reaction rail constant, a new median magnet current $I_{mag}(\delta)$ compared to the unmodulated levitation current $I_{mag}$ required for a predefined gap is set in order to keep the gap constant:

$$I_{mag}(\delta) = I_{mag} \times \frac{1}{\sqrt{1+\delta^2}} \qquad 13)$$

This results in the total forces as follows:

$$\sum F_{y\_\delta} = F_y = const. \Rightarrow \text{Condition} \qquad 14)$$

$$\sum F_{x\_\delta} = k_x \times \frac{w_{mag}}{R_{mag}} I_{mag} \times \frac{1}{\sqrt{1+\delta^2}} \times I_{st} \qquad 15)$$

and therefore $$\sum F_{x\_\delta} = \frac{1}{\sqrt{1+\delta^2}} \times F_x \qquad 16)$$

As is apparent from equation 16), the relative propulsion force is dependent on the absolute value of the modulation factor δ. In order to obtain a symmetrical modulation range, it is advantageous to position the working point at a median modulation factor δm (for example δm=0.5), i.e. to select an asymmetrical distribution of current from the outset.

FIG. 4 shows the basic profile of the relative magnet currents Imag1 and Imag2 and of the resulting propulsion force Fx as a function of the modulation factor δ.

Different control signals, which are denoted by the reference symbols S+ and S− in FIG. 3, are accordingly applied to the two magnet control units 420 and 430 of each levitation magnet pair 350 by a processing unit 400 of the control device 300; in this context the following applies:

S+=Imag'+δ*Imag

S−=Imag'−δ*Imag where Imag' denotes the magnet current which is necessary on average and which is required for the gap SP which is provided.

Since the modulation factor δ in equation 16) for the propulsion force occurs only quadratically, it is irrelevant what sign the modulation factor δ has; which magnet control unit on the levitation frame the current is increased in and which the current is reduced in is therefore insignificant. The remaining degree of freedom in the distribution of the signs of the modulation factor δ along the vehicle can be used for commercial considerations—in order to keep the additional thermal loading on the levitation magnets as small as possible on average and to distribute it uniformly among all the levitation magnets, the signs of the modulation can be interchanged, for example, at certain time intervals. In order to keep the asymmetry of the magnet currents as small as possible, the set modulation factor δ can also be selected as a function of the damper force which is currently required to damp oscillations, with the result that in the steady state, for example after the starting up process has ended, when no oscillations are expected, the modulation factor δ is set to virtually zero, and additional thermal loading of the levitation magnets is therefore avoided. Moreover, during a phase with a high driving force (acceleration phase or breaking phase), the degree of freedom in the selection of the sign of the modulation factor δ is set, in contrast to the requirements above, in such a way as to reduce the kinematic effects of the application of the driving force to the chassis structure in terms of changing the air gap.

The processing device 400 can be embodied, for example, as a microprocessor which calculates, from the input signal v_poleangle of the pole angle change measuring device 310, the suitable values for the modulation factor δ and the levitation magnet current Imag' for the magnet control units. In the simplest case, as soon as the modulation function is activated in order to damp an oscillating movement (special operating mode), the modulation factor δ is set to +0.5 and added to the signal v_poleangle with an adapted amplitude, and the resulting modulation factor δ is output on the control line 460, and the median levitation magnet current Imag' is output on the control line 470, in each case as a control signal, for example as follows:

$$\delta = 0.5 + k*v\_poleangle \qquad 19)$$

In this case, when there is a positive pole angle speed (vehicle repeats the driving stator field), there is a reduction in the original driving force Fx, and therefore the desired damping of the movement. The factor k is a predefined positive number with which the control behavior can be adapted to the specific track parameters of the respective magnetic levitation track.

Under certain circumstances, a control problem may occur if the fundamental force of the drive Fx changes its sign, i.e. if the vehicle changes from the driving range into the breaking range. In this case, specifically the direction of control of the damping control changes and a stimulating force is generated; the control would then become unstable. Since the method for damping oscillating movements which is described here is, in terms of the basic idea, an emergency operating mode of the traffic system, a constant positive acceleration could be defined in a virtual fashion before the start of the travel and the previously known up method, mentioned at the beginning, could be switched over to after a minimum speed has been reached. In this configuration, the modulation factor δ would therefore assume a value which is unequal to zero only during starting up (special operating mode) in order to be able to suppress any oscillating movements which occur; after the ending of the starting up process, the modulation is then, for example, switched off by setting the modulation factor δ to zero (for example as a normal operating mode).

It is also possible to observe the direction of force continuously and to introduce it as a sign determiner for the equation 19). In this case, the following is obtained for the modulation factor δ:

$$\delta = 0.5 + k*v\_poleangle*sign(F_x) \qquad 21)$$

The force Fx decreases conveniently during the measurement of the pole angle speed in the form of the pole angle itself because in the case of a synchronous machine the driving force is calculated as follows:

$$F_x = c_{motor} * \sin(\gamma_{poleangle}) \qquad 22)$$

Accordingly, the following is obtained:

$$\delta = 0.5 + k*v\_poleangle*sign(\sin(\gamma_{poleangle})) \qquad 23)$$

As is apparent from equation 23), the control loop, and therefore the optimum factor k, is dependent on the median pole angle. This can also be taken into account in the processing device 400.

Moreover, the function of the addition elements 480 is not only to permit the coupling of the individual magnet control units to the control lines 460 and 470. Said addition elements 480 also ensure freedom from reaction, with the result that it continues to be ensured that the basic function of the magnet control units cannot be disrupted.

The pole angle change measuring device 310 is used, as already mentioned, to measure the change variable v_poleangle which specifies the speed of the pole angle change. This can be done in different ways, as will now be explained:

FIG. 5 illustrates an exemplary embodiment of a pole angle change measuring device 310 in which the change variable v_poleangle is formed by deriving over time the pole angle γ of a pole angle measuring device 600, for example a stray field measuring probe, installed on the vehicle. A differentiating element 610 is provided for the derivation process. The pole angle change measuring device 310 measures the stray field of the stator winding with respect to the vehicle coordinates, and in this way forms the pole angle γ, and through the derivation process the change variable v_poleangle which specifies the rate of change of the pole angle.

FIG. 6 illustrates an exemplary embodiment of a pole angle change measuring device 310 in which the change variable v_poleangle is formed by evaluating the acceleration $a_{vehicle}$ in the direction of travel, measured on the vehicle with an acceleration sensor 620. However, this requires information from the drive side as to how quickly the stator field is accelerated in order to be able to differentiate the oscillations of the vehicle from the acceleration $a_{drive}$ of the stator field. The acceleration $a_{drive}$ can be measured or read out, as a fixed prescribed value, from a memory 630.

In the following equation 31), the acceleration of the stator field is given. In equation 32), the acceleration of the vehicle is given, specifically split into a component which runs in synchronism with the drive field and a deviation therefrom, the oscillating movement delta_x(t) (all the values refer to respective mechanical lengths):

$$\alpha_{drive} = \frac{d\omega}{dt} \times \frac{\tau_p}{\pi} \quad \text{31)}$$

$$\alpha_{vehicle} = \frac{d^2}{dt^2}(x_{vehicle}) \quad \text{32)}$$
$$= \frac{d^2}{dt^2}\left(\frac{\omega * t * \tau_p}{\pi} + \Delta x_{(t)}\right)$$

$$\alpha_{vehicle} = \frac{d\omega}{dt} \times \frac{\tau_p}{\pi} + \frac{d^2}{dt^2}\Delta x_{(t)} \quad \text{33)}$$

$$\alpha_{vehicle} - \alpha_{drive} = \frac{d^2}{dt^2}(\Delta x_{(t)}) \quad \text{34)}$$

If equation 34) is integrated in an integrating element 650 arranged downstream of a difference forming element 640, a variable is obtained which is a measure of the speed of the oscillating movement.

In order, finally, to arrive at the desired change variable v_poleangle, the result is also multiplied by the scaling factor between the electrical data and the linearly mechanical data, specifically π/τp (τp: pole pitch interval). The following is obtained:

$$v_{poleangle} = -\frac{\pi}{\tau_p} \times \int (\alpha_{vehicle} - \alpha_{drive})dt \quad \text{35)}$$

FIG. 7 illustrates an exemplary embodiment of a pole angle change device 310 in which two sensors 670 and 680 are used on an inductive basis, for example measuring coils, which detect the slip speed dγ/dt of the vehicle with respect to the traveling wave of the stator magnetic field.

The two sensors are at a distance of τp/2 from one another and are preferably located outside the influence of the levitation magnet; one of the two sensors is at a distance from the magnetic reference axis of the vehicle which corresponds to an integral multiple of 2*π.

For example the following voltages U1 and U2 occur at the two sensors:

$$U1 = N \times \left(-\sin\left(\frac{\Delta x_{(t)} * \pi}{\tau_p}\right) \times \frac{d\Delta x_{(t)} * \pi}{dt * \tau_p}\right) \text{ and}$$

$$U2 = N \times \left(-\cos\left(\frac{\Delta x_{(t)} * \pi}{\tau_p}\right) \times \frac{d\Delta x_{(t)} * \pi}{dt * \tau_p}\right)$$

if, for example, a cosinusoidal profile of the stator magnetic field is used as a basis.

If the two coil voltages U1 and U2 are then considered to be a real part and a virtual part of a complex pointer measurement variable, the pole angle γ and the change variable v_poleangle can therefore be determined in an evaluation device 690 arranged downstream, in accordance with:

$$\gamma = a\tan2\left(\frac{U1}{U2}\right)$$

$$v\_poleangle = \frac{d}{dt}\left(a\tan2\left(\frac{U1}{U2}\right)\right)$$

The function a tan 2 is to be understood here, as is known, as the inverse function of the angle function tangent in which, in addition to the quotient tan(x)=sin(x)/cos(x) a validity range of −π to +π, that is to say a complete period of the desired angle γ1, is obtained by taking into account the sign of the counter is obtained; in contrast to this the function a tan(x) is defined only in the range −π/2 to +π/2.

If the amplitude of the oscillation becomes very small, the pole angle γ can often no longer be reliably determined because the induced voltages U1 and U2 become too small. This can lead to a situation in which the processing device 400 of the control device 300 according to FIG. 3 outputs, where possible, incorrect actuation signals on the control lines 460 and 470, as a result of which, where possible, the oscillations can become larger again. This results in a quasi-static process with continual actuation intervention, which may be disruptive under certain circumstances. Such behavior can be avoided if the absolute value of the induced voltages is formed and monitoring of a lower limiting value is carried out. If said lower limiting value is undershot for a predefined time period (for example a period length of the oscillation), the change variable v_poleangle is rejected and the modulation factor δ is set to zero.

LIST OF REFERENCE SYMBOLS

10 Magnetic levitation vehicle
20 Magnetic levitation track
30 Track-side stator
40 Stator grooves
50 Stator teeth
60 Levitation magnet
60a,60b Levitation magnet
60c,60d Levitation magnet
70 Solenoids
110 Carrier
300 Control device
310 Pole angle change measuring device
350 Levitation magnet pair
360 Force transmitting device
370 Connecting part
400 Processing device
410,420 Magnet control unit
430,440 Magnet control unit
450 Gap sensor
460,470 Control line
600 Pole angle measuring device
610 Differentiating element
620 Acceleration sensor
630 Memory
640 Difference forming element
650 Integrating element
670,680 Sensor
690 Evaluation device
Bs Magnetic reference axis of the stator
Bf Magnetic reference axis of the magnetic levitation vehicle
S Fundamental wave of the stator magnetic field
T Levitation magnetic field
$\gamma$ Pole angle
Fx Propulsion force or driving force
Fy Levitation force
SP Gap

The invention claimed is:

1. A method for controlling a drive of a magnetic levitation vehicle on a magnetic levitation track, which comprises the steps of:
generating a levitation magnetic field on the magnetic levitation vehicle by respectively feeding in a vehicle-side levitation magnet current into at least two levitation magnets of the magnetic levitation vehicle to bring about a predefined air gap between the magnetic levitation vehicle and a track-side reaction rail;
feeding a stator current into a track-side stator of the magnetic levitation track to bring about a propulsion force on the magnetic levitation track, the propulsion force acting on the magnetic levitation vehicle being determined by a magnetic coupling between a stator magnetic field and the levitation magnetic field; and
damping an oscillating movement of the magnetic levitation vehicle relative to the stator magnetic field by changing the magnetic coupling between the stator magnetic field and the levitation magnetic field on a vehicle side, by operating the levitation magnets on the vehicle side with at least two individual levitation magnet currents of different sizes;
setting a distribution of the current between the levitation magnets such that the predefined air gap between the magnetic levitation vehicle and a reaction rail remains constant independently of a respectively set magnetic coupling;
during a predefined special operating mode, feeding in the at least two individual levitation magnet currents of different sizes into the levitation magnets, and a special coupling, which is reduced compared to a maximum possible coupling, between the stator magnetic field and the levitation magnetic field is set, and
if the magnetic levitation vehicle is moving quicker than the stator magnetic field in a direction of travel, reducing the magnetic coupling by increasing the difference in current in the individual levitation magnet currents; and
if the magnetic levitation vehicle is moving slower than the stator magnetic field in the direction of travel, increasing the magnetic coupling by reducing a difference in current in the individual levitation magnet currents.

2. The method according to claim 1, wherein within a scope of a drive control, a change in a pole angle between the stator magnetic field and a magnetic reference axis of the magnetic levitation vehicle is counteracted.

3. The method according to claim 2, which further comprises:
measuring the change in the pole angle over time to form a change variable; and
changing the magnetic coupling between the stator magnetic field and the levitation magnetic field in dependence on the change variable.

4. The method according to claim 1, which further comprises:
reducing the magnetic coupling if the magnetic levitation vehicle is moving quicker than the stator magnetic field in a direction of travel; and
increasing the magnetic coupling if the magnetic levitation vehicle is moving slower than the stator magnetic field in the direction of travel.

5. The method according to claim 1, which further comprises actuating the levitation magnets in pairs such that a levitation force of a levitation magnet pair respectively remains constant.

6. The method according to claim 5, which further comprises forming the levitation magnet pairs such that the levitation magnets of each levitation magnet pair are respectively located directly next to one another.

7. The method according to claim 5, which further comprises forming the levitation magnet pairs such that in each case a force transmitting device for transmitting a force between a frame of the magnetic levitation vehicle and the respective levitation magnet pair is located between the levitation magnets of each levitation magnet pair.

8. The method according to claim 1, which further comprises controlling the current through the levitation magnets over time such that averaged over time a same current flows through all the levitation magnets.

9. The method according to claim 1, which further comprises selecting a set difference in current between the individual levitation magnet currents in a predefined special operating state in dependence on a control effect which is required at a respective time, and the difference in current is set smaller the smaller the respectively required control effect.

10. A magnetic levitation vehicle, comprising:
levitation magnets;
a gap measuring device for measuring an air gap between said levitation magnets and a track-side reaction rail;
a control device connected to said gap measuring device and causes a generation of a levitation magnet current for said levitation magnets of the magnetic levitation vehicle, said control device configured such that, in order to damp an oscillating movement of the magnetic levitation vehicle relative to a stator magnetic field, said control device can change a magnetic coupling between the stator magnetic field and the levitation magnetic field by feeding individual levitation magnet currents of different sizes into said levitation magnets;

said control device is suitable for dimensioning the individual levitation magnet currents such that a total levitation force of all said levitation magnets of the magnetic levitation vehicle and said air gap between the magnetic levitation vehicle and the track side reaction rail remains constant independently of a respectively set magnetic coupling;

said control device:
  in a special operating mode feeds the individual levitation magnet currents of different sizes into said levitation magnets and sets a special coupling, which is reduced compared to a maximum possible coupling, between the stator magnetic field and the levitation magnetic field;
  if the magnetic levitation vehicle moves quicker than the stator magnetic field in the direction of travel, said control device reduces the magnetic coupling by increasing a difference in the current between the individual levitation magnet currents; and
  if the magnetic levitation vehicle moves slower than the stator magnetic field in the direction of travel, said control device increases the magnetic coupling by reducing a difference in the current between the individual levitation magnet currents.

11. The magnetic levitation vehicle according to claim 10, wherein said control device is suitable for counteracting a change in a pole angle between the stator magnetic field and a magnetic reference axis of the magnetic levitation vehicle by changing the magnetic coupling.

12. The magnetic levitation vehicle according to claim 11, further comprising a pole angle change measuring device for measuring the change in the pole angle over time to form a change variable, said pole angle change measuring device is connected to said control device.

13. The magnetic levitation vehicle according to claim 12, wherein said pole angle change measuring device has a pole angle measuring device and a differentiating element.

14. The magnetic levitation vehicle according to claim 12, wherein said pole angle change measuring device includes:
  an acceleration sensor for measuring an acceleration of the magnetic levitation vehicle;
  a difference forming element disposed downstream of said acceleration sensor and forms a difference value between a respective acceleration value of said acceleration sensor and a predefined acceleration value of the stator magnetic field; and
  an integrating element disposed downstream of said difference forming element.

15. The magnetic levitation vehicle according to claim 12, wherein said pole angle change measuring device has two induction coils and an evaluation device disposed downstream.

16. The magnetic levitation vehicle according to claim 10, wherein said control device:
  reduces the magnetic coupling if the magnetic levitation vehicle is moving quicker than the stator magnetic field in a direction of travel; and
  increases the magnetic coupling if the magnetic levitation vehicle is moving slower than the stator magnetic field in the direction of travel.

17. A magnetic levitation vehicle, comprising:
  levitation magnets;
  a gap measuring device for measuring an air gap between said levitation magnets and a track-side reaction rail;
  a control device connected to said gap measuring device and causes a generation of a levitation magnet current for said levitation magnets of the magnetic levitation vehicle, said control device configured such that, in order to damp an oscillating movement of the magnetic levitation vehicle relative to a stator magnetic field, said control device can change a magnetic coupling between the stator magnetic field and the levitation magnetic field by feeding individual levitation magnet currents of different sizes into said levitation magnets;
  said control device is suitable for dimensioning the individual levitation magnet currents such that a total levitation force of all said levitation magnets of the magnetic levitation vehicle and said air gap between the magnetic levitation vehicle and the track side reaction rail remains constant independently of a respectively set magnetic coupling; and
  said levitation magnets are respectively actuated in pairs such that a levitation force of each levitation magnet pair remains respectively constant.

18. The magnetic levitation vehicle according to claim 17, wherein said levitation magnets of each levitation magnet pair are respectively located directly next to one another.

19. The magnetic levitation vehicle according to claim 17, further comprising:
  a frame; and
  force transmitting devices each for transmitting a force between said frame of the magnetic levitation vehicle and each said levitation magnet pair, said force transmitting devices each being located between said levitation magnets of a respective levitation magnet pair.

20. The magnetic levitation vehicle according to claim 19, wherein at least one of said force transmitting devices of the magnetic levitation vehicle is formed by a spring.

* * * * *